United States Patent [19]
Srikanth et al.

[11] Patent Number: 5,412,758
[45] Date of Patent: May 2, 1995

[54] FLEXIBLE SYSTEM FOR KNOWLEDGE ACQUISITION IN EXPERT SYSTEM DEVELOPMENT

[75] Inventors: Usha Srikanth; Srikanth Sundararajan, both of Ft. Collins, Colo.

[73] Assignee: Hewlett-Packard Company, Palo Alto, Calif.

[21] Appl. No.: 965,985

[22] Filed: Oct. 23, 1992

Related U.S. Application Data

[63] Continuation of Ser. No. 686,093, Apr. 16, 1991, abandoned.

[51] Int. Cl.⁶ .............................................. G06F 15/18
[52] U.S. Cl. ...................................... 395/75; 395/12; 395/76
[58] Field of Search ................... 395/75, 76

[56] References Cited

U.S. PATENT DOCUMENTS

| | | | |
|---|---|---|---|
| 4,920,499 | 4/1990 | Sheirik | 364/513 |
| 4,954,964 | 9/1990 | Singh | 364/513 |

OTHER PUBLICATIONS

Young, D. A., The X Window System: Programming and Applications with Xt, Prentice Hall, 1990, pp. 1–13, 79–83, 189–197.

White et al., Standards and Review Manual for Certification in Knowledge Engineering, Systemware Corp., 1990, pp. 388–389.

Advertisements ("Product Showcase"), AI Expert, Jan. 1991, pp. 70–71.

Clayton, B. D., Art TM Programming Primer, Inference Corp., 1985.

Preraun et al., "Maintainability Techniques in Developing Large Expert Systems", IEEE Expert, Jun. 1990, pp. 71–80.

Musen, M. A., "An Editor for the Conceptual Models of Interactive Knowledge-Acquisition Tools", Knowledge Systems Laboratory Rept. No. KSL-88-44, Standford University, Jun. 1988.

Eshelman et al., "MOLE: A Knowledge Acquisition Tool that uses its Head", Proc. AAAI '86, Aug. 1986, pp. 950–955.

Stoddard et al., "Procedure Consultant: User-Friendly AI," AI Expert, Apr. 1989, 75–79.

Byrd, M., "cc:Mail," PC Magazine, Sep. 26, 1989, 276–278.

Keyes, J., "Branching to the Right System: Decision--Tree Software, AI Expert", Feb., 1990, 61–64.

"Product Showcase", AI Expert, Jan. 1991, 70–71.

*Primary Examiner*—Robert W. Downs

[57] ABSTRACT

An interface to an artificial intelligence system shell is provided to facilitate the task of knowledge acquisition, knowledge refinement, knowledgebase addition/modification, knowledgebase maintenance and information management relating to a specific expert system project. The interface communicates with an artificial intelligence system via a Unix® pipe to pass knowledge data therebetween in accordance with high level functions selected by the user. Preferably, these high level functions are selected via a user friendly interface such as windows. The present invention thus allows the artificial intelligence system shell to be used by those who are not particularly familiar with the artificial intelligence program by allowing the user to communicate with the artificial intelligence program without understanding the details of the artificial intelligence programming language. Since the expert system shell is accessible by a wider variety of users, the knowledgebase can be updated more efficiently such that the real benefits of artificial intelligence can be appreciated. Also, the invention may be used in a manufacturing environment along with a video interface to allow real-time analysis and control of production defects.

14 Claims, 7 Drawing Sheets

XCLIPS

XCLIPS COMMANDS

PAC SYSTEM

FLEXIBLE SYSTEM FOR KNOWLEDGE ACQUISITION IN EXPERT SYSTEM DEVELOPMENT

CROSS REFERENCE TO RELATED APPLICATIONS

This is a continuation of application Ser. No. 07/686,093, filed on Apr. 16, 1991, now abandoned.

BACKGROUND OF THE INVENTION

1. Field of the Invention

The present invention relates to a flexible system for knowledge acquisition for use in developing an expert system, and more particularly, to a flexible interface to an expert system shell which facilitates the task of knowledge acquisition, knowledge refinement, knowledgebase addition/modification, knowledgebase maintenance and information management relating to specific expert system projects.

2. Description of the Prior Art

Artificial intelligence systems, or so-called expert systems, have become more commonly used in the work place. Generally, such systems are provided to enable the users to input data relating to a particular project and to maintain this data in a so-called knowledgebase. An inference engine asks questions of the user and determines from the responses and data stored in the knowledgebase what action should be taken. In particular, in accordance with predetermined rules and chaining mechanisms (the rulebase), the inference engine "learns" certain information about the process the data in the knowledgebase relates to and can be programmed to provide the necessary outputs in response to particular inputs relations.

Although expert systems are generally very helpful in systems where real-time feedback is not necessary, in the context of manufacturing their use has been limited because they are difficult to implement and even more difficult to keep updated. This is partially because the expert system is typically operated by an expert system specialist (knowledge engineer) who is not particularly familiar with the process being controlled by the expert system. Thus, when changes to the knowledgebase or rulebase must be made, the knowledge engineer must track down the person with the answer. Accordingly, the effectiveness of a typical expert system is limited by the ability of those maintaining the expert system to get the necessary updating information. It is desired that a better data acquisition process be developed so that the knowledgebase of such expert systems can be more accurately maintained.

Generally, artificial intelligence technology has not been widely used by engineers other than those engineers, such as knowledge engineers, who are familiar with artificial intelligence software. This is unfortunate, for even though many technically skilled people use workstations or minicomputers in some form to get their job done, few such people have been able to harness and use artificial intelligence technology in a sensible and practical manner. This result is most likely due to the tremendous learning curve required to learn artificial intelligence technology so that it may be used appropriately. As a result, many technically skilled people who may have benefited from the use of artificial intelligence technology have either used the technology inappropriately or ignored it all together. It is desired that some mechanism be provided to demystify artificial intelligence technology so that it can be put into the hands of such people so that they can make practical use of this technology.

Those skilled in the artificial intelligence art realize that artificial intelligence does not help in all situations but is particularly well suited for use in situations where the problem domain is not well defined and one needs the benefit of experience in order to solve the problems. Artificial intelligence is also of great help in reducing transitions from one sub-problem to another. For example, most Unix ® users have had a variety of software and other tools which help them with their jobs. However, such tools are typically point tools that need to be used together. Typically, the person using the tools develops some pattern of using these tools over a period of time. Unfortunately, when this person moves on to a new task or job, the new person taking over the old task has to spend lots of time trying to master the previous usage pattern. Although such tools may have good manuals, the art of massaging the output from one software tool so that it means something to another software tool as input is a task that is mainly gained through experience. As a result, when engineers change tasks or jobs, the overall productivity of the company is significantly reduced because of the ramp-up time of the new person. It is thus desired that a tool be developed which allows persons to organize all the point tools into a higher level of granularity, such as tasks, so they can concentrate on the tasks without having to worry about the minute details implemented by these tasks. It is believed that an expert system may be a partial solution of this problem; however, as noted above, getting this technology in the hands of those who need it has not heretofore been entirely successful.

Because of the complicated nature of artificial intelligence technology, the training time for new users of the technology is quite long and results in high training costs. It is desired that a mechanism be provided which allows the user to access the simple principles of artificial intelligence technology while also hiding the details thereof so that the technology may be learned more quickly. It is also desired that the artificial intelligence technology be presented to the trainers in a context where they are more likely to feel comfortable. For example, since many computer users are familiar with the use of mouses as pointing devices along with bitmap graphics based user interfaces, such as windows, it is desired that artificial intelligence technology be presented to the user by way of such a user-friendly interface so that new users are more comfortable with the artificial intelligence technology.

Artificial intelligence systems are generally difficult to use because they are based on computer languages such as lisp or to a lesser extent prolog. Such languages are generally quite unfamiliar to those users who are accustomed to traditional computer languages such as C, Pascal or Fortran. Moreover, it has been difficult to interface the lisp or prolog environments to already existing tools in meaningful ways because of the required changes in data structures. Furthermore, lisp based packages are not designed to run efficiently on workstations since they require dedicated lisp machines, which are quite expensive. Also, lisp based packages tend to require a lot of memory. A less expensive and easier to use system for accessing artificial intelligence technology is thus desired.

Despite the above-mentioned limitations, expert systems have been used with some success to diagnose defects on integrated circuit wafers in photolithography. Such expert systems operate by indicating the class of defect which has been detected and suggesting the proper way of eliminating the defect. However, as noted above, such systems are generally written in prolog or lisp, require lots of internal memory, and are not upgradable. However, to the present inventors' knowledge, such systems have only been developed for research-oriented environments and have not been applied in the manufacturing environment. As a result, the rules produced in such prior art expert systems generally have conflicting objectives with those needed in the manufacturing environment. Moreover, such systems have not heretofore provided knowledge based editing tools, nor have such systems provided means for linking the knowledgebase to an easy to use software platform. Furthermore, such systems are quite complicated and generally of little use to the persons who would provide the information to the knowledgebase. It is desired to improve upon such expert systems so that the power of artificial intelligence can be applied to manufacturing processes for providing automatic controls of such processes.

Accordingly, there is a long felt need in the art for an expert system which facilitates the task of knowledge acquisition, knowledge refinement, knowledgebase addition/modification, knowledgebase maintenance and information management relating to specific expert system projects so that artificial intelligence can be used more effectively and efficiently in the manufacturing environment. In particular, it is desired to develop an interface to an expert system shell in such a manner that the underlying processes of the expert system need not be known by the user. The present invention has been designed to meet these needs.

SUMMARY OF THE INVENTION

The present invention addresses the above-mentioned needs in the prior art by providing a flexible interface to an expert system shell which assists users of the expert system in all phases of the life cycle of expert system development. In particular, the present invention prevents the user of the expert system shell from having to worry about maintaining input/output files so that they are consistent and updated. The present invention also acts as a conduit for providing the necessary information to the person in charge of maintaining the knowledgebase of the expert system.

Generally, the present invention interfaces a user-friendly interface tool such as a window algorithm to an artificial intelligence expert system shell so that the user can more readily interface with the expert system shell. This allows the user of the expert system shell to tailor the environment of the expert system to suit that person's needs at a reasonable cost. The present invention thus provides access to an expert system by typical users who generally do not understand the operation of such expert systems and would not otherwise be motivated to use them. It is thus believed that the present invention will be important to the proliferation of artificial intelligence technology, most notably in the manufacturing environment.

In particular, the present invention relates to a method of developing an expert system having a knowledgebase using an artificial intelligence program loaded on a computer system and knowledge data provided by a user (who is not necessarily competent in any computer language) of the artificial intelligence program via a data input/output system of the computer system. Such a method in accordance with the invention preferably comprises the steps of:

interfacing via an interface the artificial intelligence program to the data input/output system of the computer system such that the artificial intelligence program and the data input/output system may communicate knowledge data therebetween, the interface having a predetermined set of commands for controlling the communication of the knowledge data to/from the artificial intelligence program;

the user selecting predetermined ones of the predetermined set of commands to run the artificial intelligence program;

the user inputting acquired knowledge data to the artificial intelligence program in response to inquiries from the artificial intelligence program via the interface as human language phrases;

the user selecting other commands of the predetermined set of commands to add or modify knowledge data represented as inputted human language phases comprising facts and rules of the artificial intelligence program;

the interface storing the human language phrases in a file accessible by the artificial intelligence program;

programming, by a knowledge engineer who is proficient in a computer language of the artificial intelligence program, the stored human language phrases into the artificial intelligence program in the computer language understandable by the artificial intelligence program; and the knowledge engineer updating the knowledgebase on a periodic basis in accordance with the human language phrases programmed into the computer language understandable by the artificial intelligence program.

Preferably, such a method in accordance with the invention comprises the further step of distributing the expert system to multiple users over a computer network so that the multiple users can share knowledge data. In a preferred implementation of the invention, the knowledge data comprises descriptions of manufacturing defects detected during a manufacturing process. When so implemented, the method of the invention preferably comprises the further step of displaying the manufacturing defects on a video monitor so that the user can properly identify the manufacturing defect to be input as the knowledge data.

The invention further includes a method of providing user, who is not necessarily competent in any computer language, access via a data input/output system of a computer system to knowledge data determined using an artificial intelligence program loaded on the computer system. Such a method in accordance with the invention preferably comprises the steps of:

interfacing via an interface the artificial intelligence program to the data input/output system of the computer system such that the artificial intelligence program and the data input/output system may communicate knowledge data therebetween, the interface having a predetermined set of commands for controlling the communication of the knowledge data to/from the artificial intelligence program;

the user selecting one of the predetermined set of commands to access the artificial intelligence program;

the interface converting the selected command into a computer language understandable by the artificial intelligence program;

the user inputting acquired knowledge data via the interface as human language phases in accordance with the selected command;

the interface storing the inputted human language phases in a file accessible by the artificial intelligence program; and programming, by a knowledge engineer who is proficient in a computer language understandable by the artificial intelligence program, the stored human language phrases into the artificial intelligence program in the computer language understandable by the artificial intelligence program.

The invention further relates to an expert system developed in accordance with the method described herein and loaded on a computer system having a data input/output device. Preferably, such an expert system in accordance with the invention comprises a knowledgebase for storing accumulated knowledge data input over time, a rule based artificial intelligence program loaded on the computer system for manipulating the knowledge data, and means for interfacing the artificial intelligence program to the data input/output device of the computer system such that the artificial intelligence program and the data input/output device may communicate knowledge data therebetween. The interfacing means of the invention preferably comprises means for controlling the communication of knowledge data provided by a user who is not necessarily competent in any computer language to and from the artificial intelligence program, and means for accepting knowledge data as human language phrases and for storing the human language phrases in a file for later conversion into a computer language understandable by the artificial intelligence program by a knowledge engineer who is proficient in the computer language of the artificial intelligence program for use the replace "thereby" with the artificial intelligence program in updating the knowledgebase and in modifying rules of the artificial intelligence program.

In a preferred embodiment, the means for controlling the communication of knowledge data comprises a control window having a predetermined set of commands and a data pipeline for passing the knowledge data between the artificial intelligence program and the data input/output device of the computer system. The aforementioned predetermined set of commands may include an add command and a modify command for respectively adding and modifying the knowledgebase in accordance with user input to the interfacing means.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

An interface method which affords the above-mentioned and other beneficial features in accordance with the presently preferred exemplary embodiment of the invention will be described below with reference to FIGS. 1–5. Those skilled in the art will readily appreciate that the description given herein with respect to those figures is for explanatory purposes only and is not intended in any way to limit the scope of the invention. For example, although the present invention is described for use with an expert system shell called CLIPS and uses an X11 toolkit to provide a window interface to the computer screen, those skilled in the art will appreciate that the general principles of the invention may be used with different expert system shells and different user interfaces. Accordingly, all questions regarding the scope of the invention should be resolved by referring to the appended claims.

A particular embodiment of the invention will be described for providing a user interface to the CLIPS expert system shell available through COSMIC, The University of Georgia, 382 East Broad Street, Athens, Ga. 30602. The user interface of the invention hereinafter will be referred to as XCLIPS in order to avoid ambiguity. Preferably XCLIPS is designed and implemented in a preferred embodiment with the help of an X11 toolkit, which is readily available as a user interface in the Unix ®/VMS segment of the computer industry. However, as just noted, the present invention may be used to interface to any expert system shell using the techniques herein described.

Figure 1:
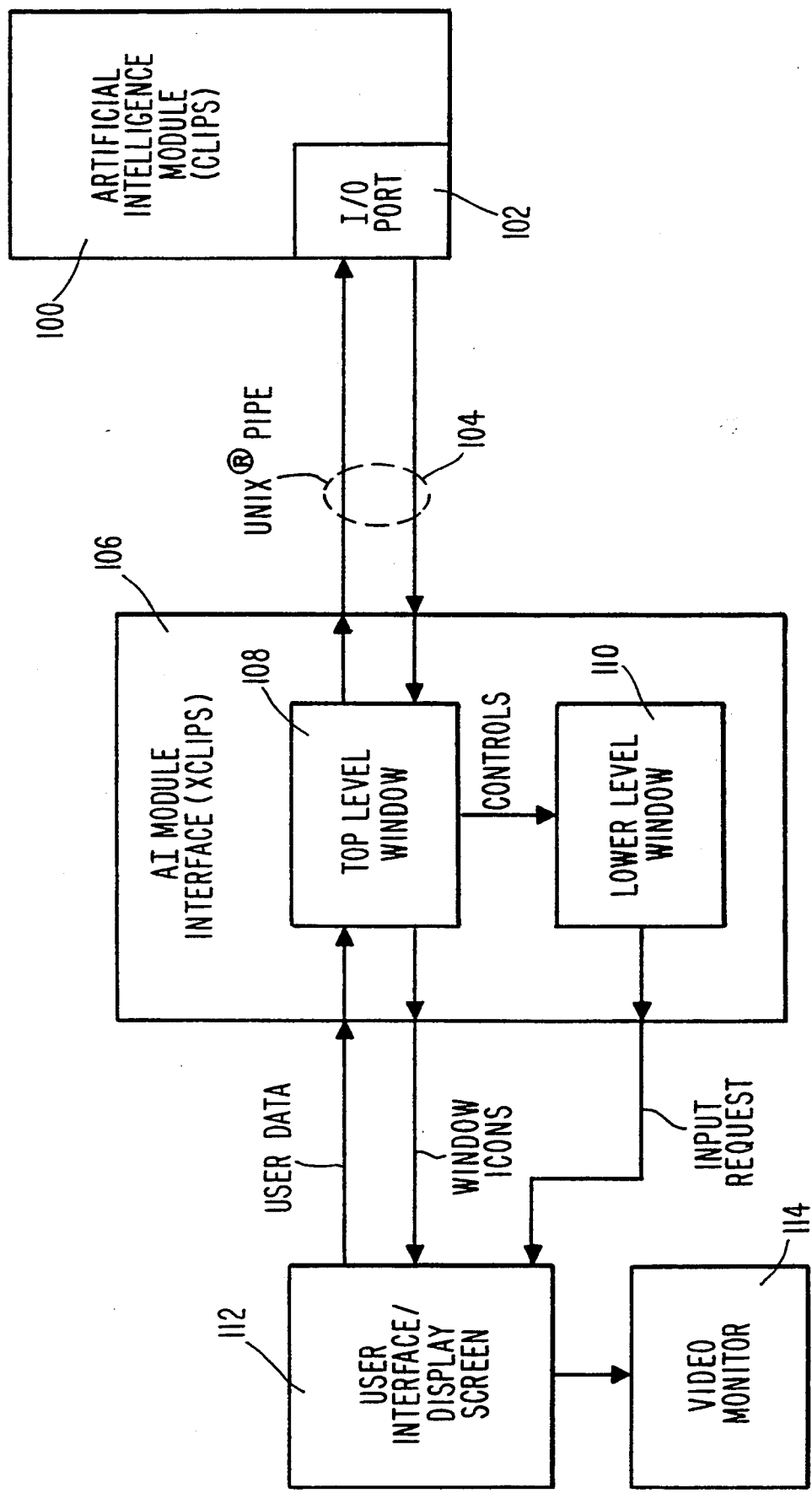
FIG. 1 schematically illustrates an expert system incorporating an artificial intelligence interface in accordance with a preferred embodiment of the present invention.

The present invention is designed to provide an interface to an expert system shell so that the user can more readily learn how to use the expert system. A preferred embodiment of the present invention is shown in FIG. 1. As shown, artificial intelligence module (expert system shell) 100 is provided with an input/output port 102 so that it can communicate over an interprocess communication device such as a Unix ® pipeline 104 with an external process. Such an external process in accordance with the present invention is preferably the artificial intelligence module interface 106. In a preferred embodiment, artificial intelligence module 100 comprises a CLIPS expert system shell. As will be described in more detail below, XCLIPS 106 interfaces CLIPS to a user-friendly interface such as windows. In particular, XCLIPS 106 implements a top level window 108 and a lower level window 110 to provide interprocess communication with CLIPS 100 and to interface with a user interface/display screen 112. As will also be described in more detail below, the top level window 108 presents window information such as control buttons or icons to the user interface/display screen 112 so that the user can implement the desired command and preferably provides the mechanism for the user to input data for insertion into the knowledgebase of CLIPS. The lower level window 110 may be used to communicate messages from CLIPS to the user. Finally, a video monitor 114 also may be used for those situations where the expert system is used for analyzing defects in products or processes in the manufacturing environment. This aspect of the invention will be described below with respect to FIG. 5.

As known to those skilled in the artificial intelligence art, CLIPS is an expert system shell available from NASA through Cosmic at the above-mentioned address. CLIPS is an inference engine written in the computer programming language C. It provides mechanisms for forward chaining, backward chaining, and a combination thereof. CLIPS follows the true definition of an inference engine whereby facts can be statically or dynamically introduced (asserted) or removed (retracted) and rules configured to trigger facts. CLIPS also contains other helpful features such as traceability, which is useful for debugging purposes, and a working memory display (for the examination of internal states), as well as other debugging options.

The triggering mechanism of CLIPS pertaining to rules is based on the well-known "unification" algorithm. CLIPS also provides "multi-valued logic" to a limited extent by allowing primitive set operations whereby variables are explicitly bound to sets of values and set operations like intersection, subset and union are allowed. The combination of multi-valued logic and unification can be a powerful engineering mechanism for problem solving. The following example should illustrate this feature:

```
(deffact (bird1 duck)) ; ; ; variable bird1 set to duck
(assert (birds duck chicken sparrows))  ; ; ; birds is a set
                                         ; ; ; containing . . .
(subset bird1 birds) ; ; ; this operation yields a value True
(intersection bird1 birds) ; ; ; yields duck
```

Rules are of the following format:

```
                <antecedents . . . >
                =>
                <consequents . . . >
```

The following rule makes use of unification:

```
(defrule "an example")
(bird1 ?var)
(subset ?var birds)
=>
(format t "%s belongs to the set of birds" ?var))
```

In the above example, (Birds1 ?var) and (subset ?var birds) are the antecedents. They can be thought of as triggers that have to evaluate to true before the consequent (format t "%s belongs to the set of birds" ?var) can be executed. The first antecedent is unified with (Bird1 duck) leading to duck being bound to ?var. Since duck is a subset of birds, the second antecedent evaluates to true, leading to the execution of the consequent. A more complete description of unification and other multi-valued logic operations can be found in fundamental artificial intelligence texts and thus will not be treated in any further detail here.

The primary method of representing knowledge in CLIPS is a rule, where a rule is a collection of conditions and the actions to be taken if the conditions are met. The rules describe how to solve a problem, and the entire set of rules is referred to herein as the knowledgebase. CLIPS provides the mechanism (inference engine) which attempts to match the rules therein to the current state of the system and to apply the appropriate actions. The current state is represented by a list of facts which may be provided from the knowledgebase or by the user.

Facts are the basic form of data in the CLIPS system. Each fact represents a piece of information which has been placed in the current fact list. Rules execute based on the existence or non-existence of these facts. A fact is constructed of several fields, and any number of fields may be stored in a fact, where the number of facts is limited only by the memory in the computer. A fact is asserted into the fact list prior to starting execution and may be added (asserted) or removed (retracted) as the action of a rule firing. As known to those skilled in the art, the field for facts can be either a number, a word or a string.

Once a knowledgebase in the form of rules is built and the fact list prepared, CLIPS is ready to execute rules. The basic execution cycle is as follows:

1. The knowledgebase is examined to see if the conditions of any rules have been met.
2. All rules whose conditions currently are met are activated and placed on a stack register. Rules are pushed onto the stack when they are activated. If the priority of the new rule is less than the rule currently on top of the stack, the new rule is pushed down the stack until all rules of higher priority are above it. Rules of equal and lower priority remain below the new rule.
3. The top rule on the stack is selected and its right-hand side (RHS) actions are executed. As a result of RHS actions, new rules can be activated or de-activated. This cycle is repeated until all rules that fire have done so or until the rule limit is reached.

Two defining constructs appear in CLIPS, namely, "defrule" and "deffacts". Rules are defined using the "defrule" construct and have the following syntax:

```
(defrule <name> ["<comment>"]
[(< <first pattern>>)
    •
    •        ;Left-hand side
    •
(< <nth pattern>>)]
=>
[(< <first action>>)
    •
    •        ; Right-Hand side
    •
(< <mth action>>)]),
``` where <name> is a word starting with an alphabetic character. As shown, the left-hand side (LHS) is made up of a series of patterns which represent the condition elements for the rule, while the right-hand side (RHS) is the list of actions to be performed when the LHS of the rule is satisfied. The arrow (=>) separates the LHS and the RHS. The actions are performed sequentially if and only if all conditions are satisfied on the LHS. For example:

```
(defrule example-rule "This is an example of a simple rule"
   (system light on)
   (system login open)
=>
   (assert (system running)))
```

Facts are defined using the "deffacts" construct. Facts can be added to initial fact lists, and facts asserted through deffacts may be retracted or pattern matched like any other fact. The initial fact list, including any defined deffacts, is always reconstructed after a reset. The syntax of the deffacts construct is as follows:

```
(deffacts <name>
    [(< <fact1> >)
     •
     •
     (< <fact n> >)]),
``` where <name> is a word used to identify a set of facts. All expressions are evaluated when CLIPS is reset.

From the above examples, it is apparent that the syntax of CLIPS is lisp-like and not very intuitive to engineers who are used to programming in computer programming languages such as C, Pascal, and Fortran. XCLIPS 106 is thus designed to eliminate the need to master this syntax, especially when engineers start using CLIPS. If desired, once the engineers become more proficient with CLIPS, they are free to interact with CLIPS in its native mode. XCLIPS is thus designed to cater to all levels of user sophistication.

XCLIPS will now be described in more detail with reference to FIGS. 1-5.

As noted above, the XCLIPS interface is based on the standard X11 toolkit, which is a commonly used windowing user interface on Unix ®/VMS based computer systems. Since the X11 toolkit is believed to be well known, it will not be described in detail here. As shown in FIG. 1, the XCLIPS interface is comprised of a top level window 108 that controls one or more lower level windows 110. Lower level windows 110 are used to elicit information from the user by sending an input request from CLIPS to a user interface/display screen 112. The top level window 108, on the other hand, controls user actions as well as access to the CLIPS environment. As shown in FIG. 1, the top-level window 108 is tied to the CLIPS environment via Unix ® pipe 104 whereby the standard output from the top-level window 108 is tied to the standard input of the CLIPS environment, and vice versa. Preferably, the CLIPS environment process is configured as a child of the XCLIPS process. The Unix ® pipe facility allows the user to type in responses to CLIPS in the input area of the top-level window 108, while CLIPS puts out its output to the response area of the lower level window 110.

Figure 2:
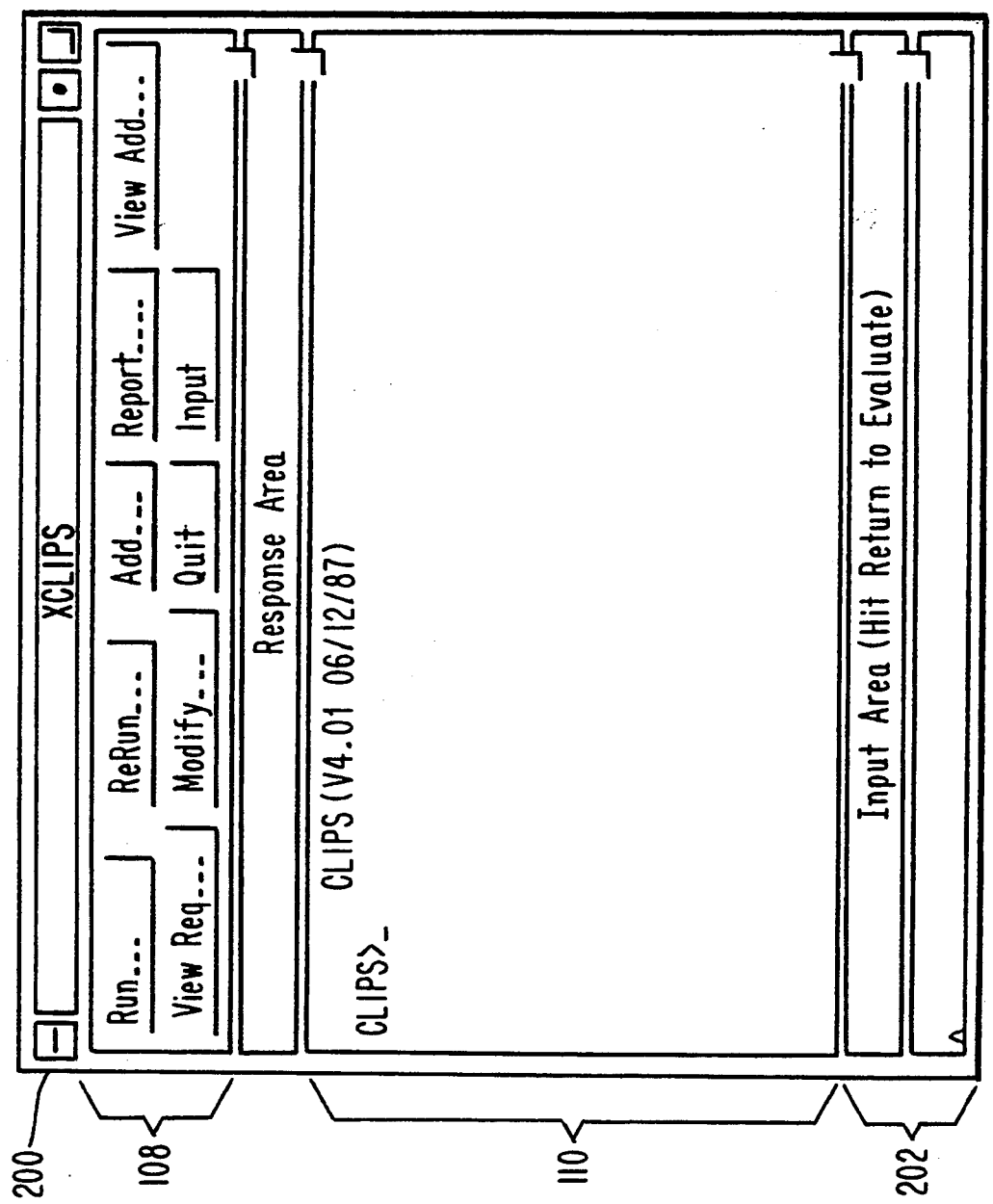
FIG. 2 illustrates an implementation of the artificial intelligence interface of the present invention using windows.

FIG. 2 illustrates an XCLIPS window interface 200 having the aforementioned top level window 108 with input area 202 and a lower level window with the response area 110. As shown in FIG. 2, the command panel of the top level window 108 consists of a number of command buttons (or icons), each of which is responsible for a control function for XCLIPS as will be described in more detail below with respect to FIG. 4.

Figure 3:
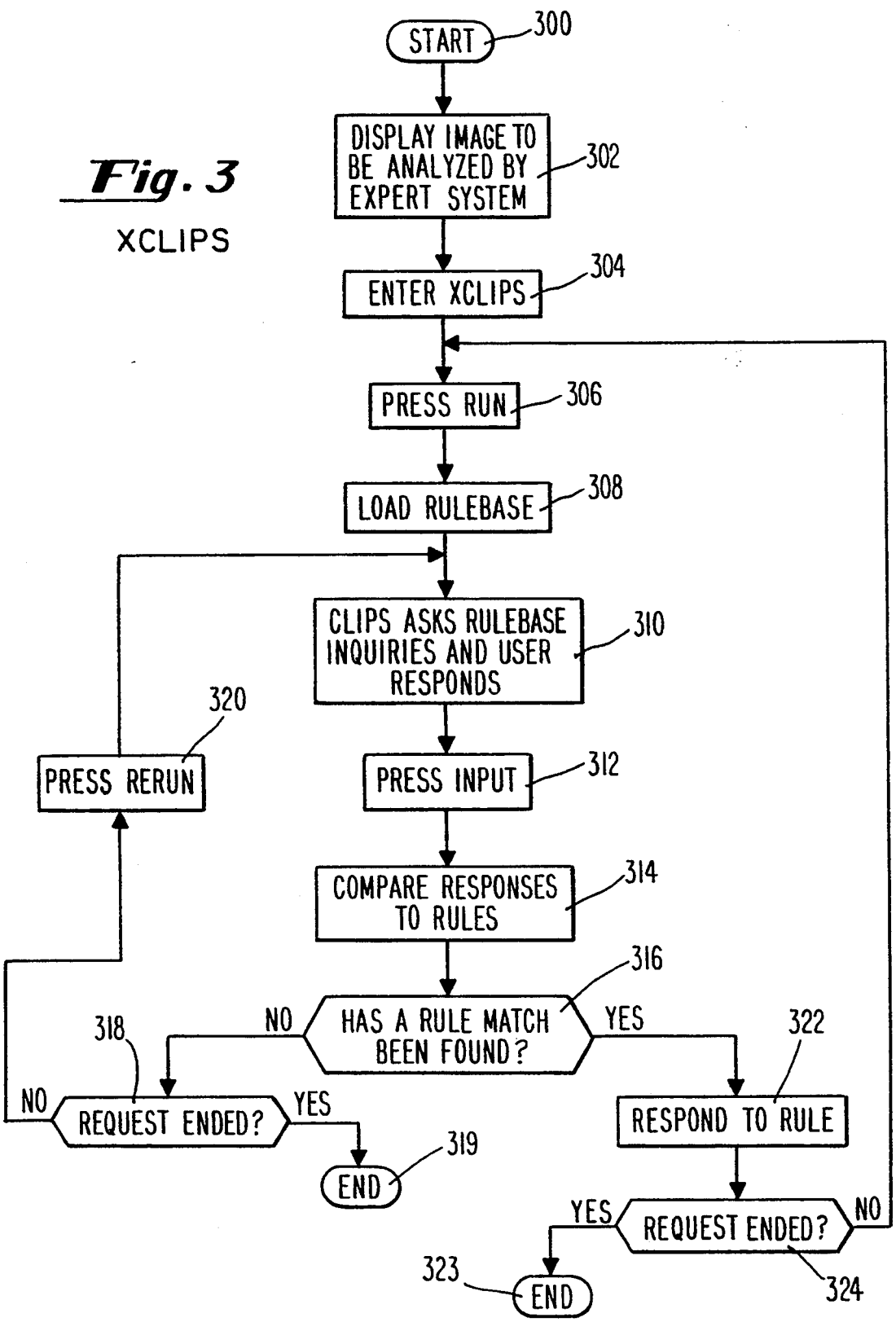
FIG. 3 is a flow diagram illustrating the execution of the interface of the present invention.

FIG. 3 illustrates a flow chart representing XCLIPS execution. As shown, XCLIPS starts at step 300 by starting up its windowing program and automatically waking up the video interface for the video monitor 114. If a video monitor 114 is used, the image to be analyzed by CLIPS is automatically displayed at step 302 so that the user can visually analyze the problem. The user then enters XCLIPS at step 304 and the windows of FIG. 2 then appear. The user then chooses a command from the command panel in the top-level window 108 using a mouse on the keyboard. For example, at the beginning of a session the user will typically press run at step 306. A dialog box may then appear so that the user can type the rulebase on which CLIPS is to operate. The rulebase is then loaded at step 308. The user is now ready to converse with CLIPS.

CLIPS starts by asking rulebased inquiries at step 310. The user typically responds with yes or no answers or one of multiple choice answers. Such answers may be typed into the input area 202 of the XCLIPS top level window 108 of FIG. 2. The user then presses INPUT at step 312. CLIPS then compares the user's responses to rules in its knowledgebase at step 314 and determines at step 316 whether a rule match has been found. If no rule match has been found, CLIPS keeps asking questions until it can find a match to a specific rule. In particular, CLIPS determines at step 318 whether the user's request has ended, and if so, XCLIPS ends at step 319. Otherwise, the user may press RERUN at step 320 so that CLIPS may ask more rulebased inquiries. On the other hand, if a rule match is found at step 316, CLIPS outputs the appropriate response from its knowledgebase at step 322. XCLIPS may then end at step 323, or if it is determined at step 324 that the user has a further request, control returns to step 306, where the user can then press RUN and start the operation again. Another rulebase may then be entered for the subsequent run.

Figure 4A:
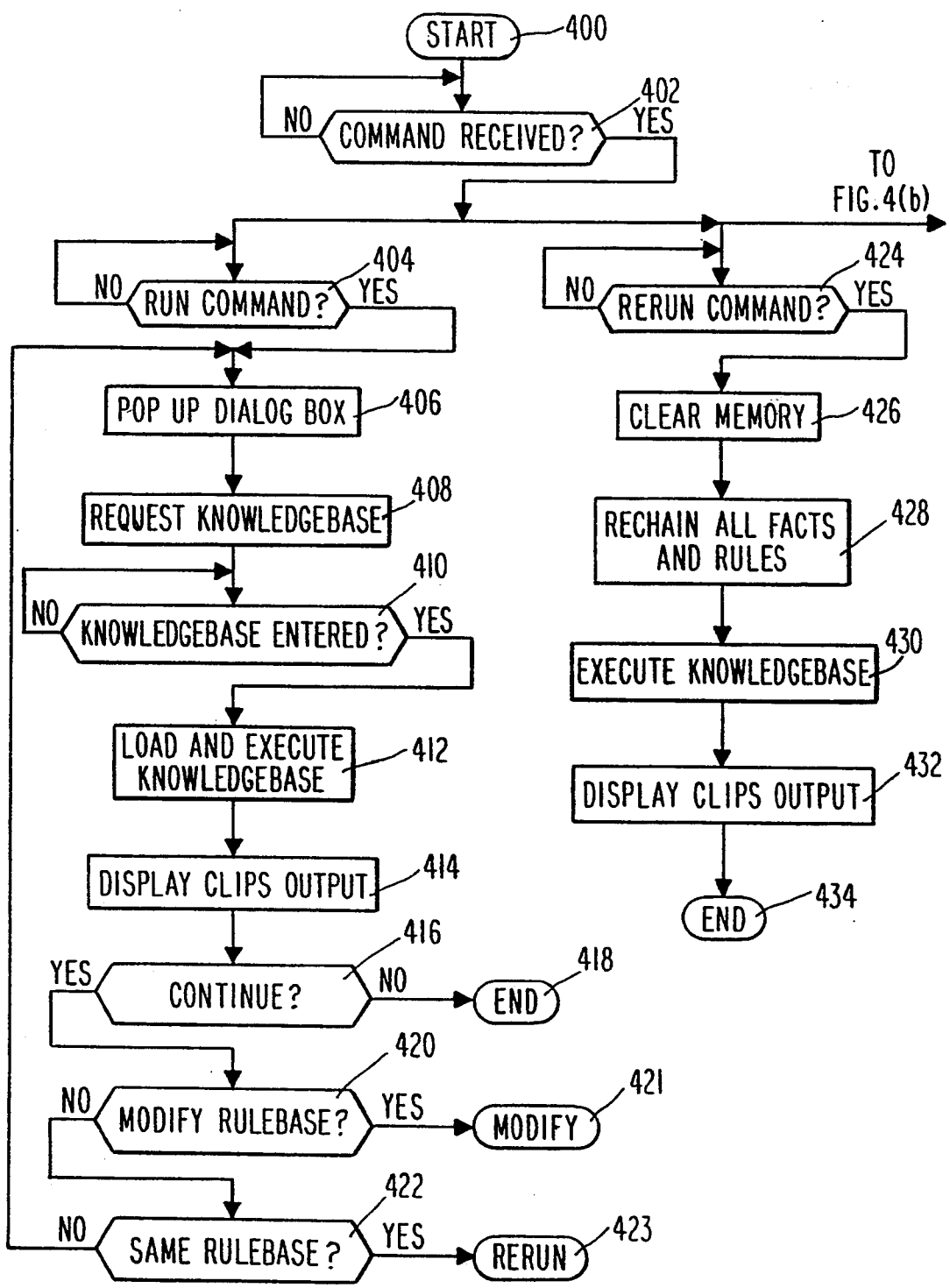
FIGS. 4(a)–4(c) together illustrate some of the functions which may be implemented by the interface of the present invention.
Figure 4B:
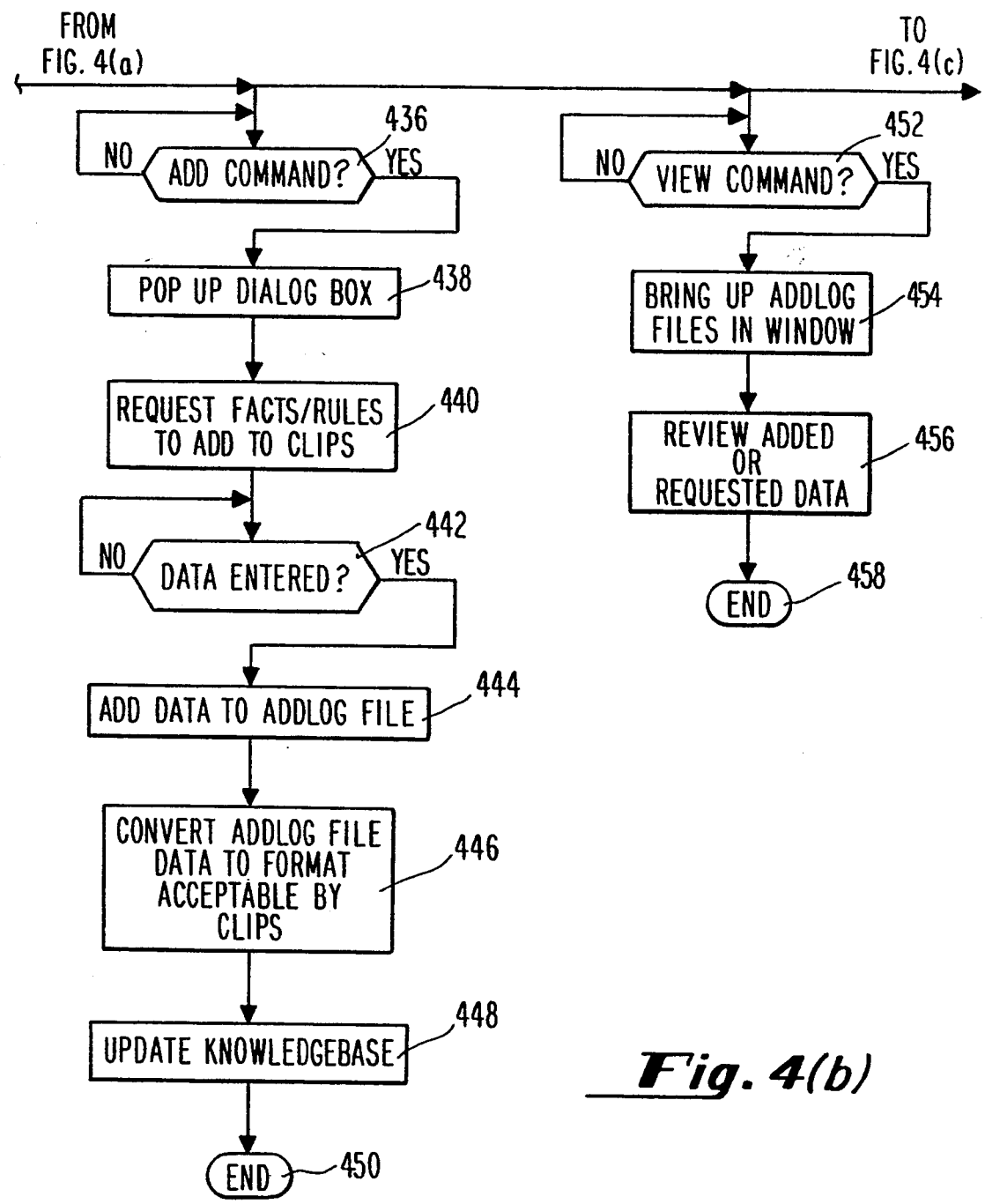
Figure 4C:
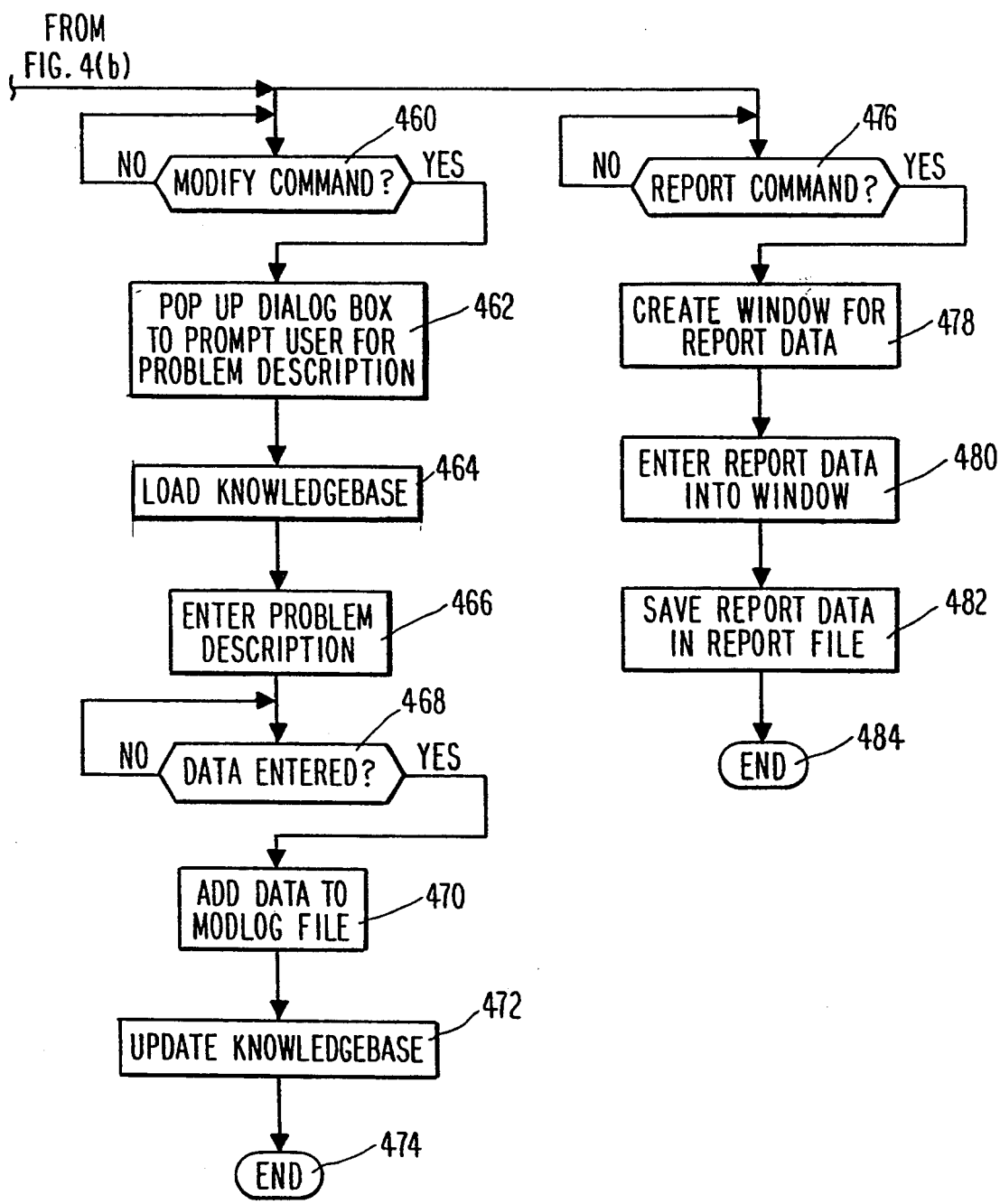

Each of the functions illustrated on the XCLIPS command panel 108 in the XCLIPS window interface 200 of FIG. 2 will now be described in detail with respect to FIGS. 4(a)-4(c).

As illustrated in FIG. 2, XCLIPS has a plurality of commands which may be selected by the user using a mouse and the like. As shown in FIG. 4(a), XCLIPS starts at step 400 and determines at step 402 whether such a command has been selected by the user. If so, processing proceeds in accordance with the selected instruction. For example, if it is determined at step 404 that the input command is a RUN command, a dialog box is popped up at step 406 which queries the user for a knowledgebase. Once the user responds with the name of the knowledgebase at step 408, it is determined at step 410 that the knowledgebase has been entered and the appropriate knowledgebase is loaded and executed within the CLIPS environment at step 412. The CLIPS output can then be displayed at step 414 in the response area of lower level window 110.

This process can then be repeated as many times as needed, and a combination of different knowledgebases can all be loaded into the CLIPS environment and executed. Once the knowledgebase begins executing, all output from the CLIPS environment is grabbed and displayed in the response area of lower level window 110 so that the user can then respond in the input area and either hit "return" or select the INPUT button. This causes the top-level window 108 to grab the user response from the input area 202 and convey it to the CLIPS environment. In a sense, this is like having a native high-level interface to CLIPS where an unsophisticated user does not need to know about the CLIPS syntax. Rather, all the user needs to know is the name of the knowledgebase and be able to type in responses to the questions that the user is asked as a result of the knowledgebase execution. However, the more sophisticated user can also interact with CLIPS in a full-fledged manner.

Once CLIPS has executed in the above manner, it will be determined at step 416 whether processing is to continue. If not, the RUN command is exited at step 418. Otherwise, it is determined whether the user wishes to modify the rulebase (step 420), and if so, control jumps to the modify command at step 421. Otherwise, it is determined at step 422 whether the same rulebase is to be used during the next run. If so, control proceeds to the RERUN command at step 423. Otherwise, control returns to step 406 so that the user can change the rulebase.

If it is determined at step 424 that the input command is a RERUN command, the working memory is cleared at step 426 and all the facts and rules are rechained as they were at the start of the session at step 428. The same rulebase is then executed at step 430 and the CLIPS output displayed in the response area of lower level window 110 at step 432. Processing of the RERUN command then ends at step 434. As will be apparent to one skilled in the art, the RERUN command is very useful in cases where the user either typed some incorrect response and wants to start all over, or in cases where the knowledge engineer wants to keep resetting the knowledgebase in order to test it.

If it is determined at step 436 that the input command is an ADD command, a dialog box pops up at step 438 which prompts the user for the facts/rules that the user wants to add to the current state of the CLIPS environment (step 440). If it is determined at step 442 that data has been entered, the facts are formatted and added to an addlog file at step 444 that corresponds to the appropriate knowledgebase. The addlog file data is then converted to a format acceptable by CLIPS at step 446 and used by the knowledge engineer at step 448 to appropriately update the knowledgebase. Processing of the ADD command then ends at step 450.

The ADD function is typically available only to the more sophisticated users of XCLIPS, such as knowledge engineers, who need to augment the behavior of the expert system. Normal users are generally not allowed to add facts/rules to the knowledgebase because they are usually unaware of its internal state and could modify its state to produce erroneous results. However, by granting special user privileges, a knowledge engineer can allow a subset of users to modify the states of the knowledgebase, as desired. On the other hand, the expert who is not familiar with the CLIPS syntax can add facts/rules to the knowledgebase via a dialog box provided by XCLIPS. The dialog box prompts the expert for variables and their binding (if needed) on a fact by fact basis. These facts are formatted, as when facts are provided by a normal user, and these facts are added to the addlog file that corresponds to the appropriate knowledgebase. Similarly, in the case of rules, antecedents and their modes are prompted for, followed by consequents. Information related to each antecedent and consequent is formatted similar to the facts, and then all of them are bundled appropriately into rules recognizable by CLIPS (step 446).

The addlog file described with respect to step 444 acts as a preventive filter against the introduction of arbitrary anomalies into the knowledgebase. Generally, the knowledge engineer will examine the addlog file and then clarify any anomalies with an expert before introducing the fact/rule into the knowledgebase at step 448. In addition, the addlog file also allows the expert to input natural language descriptions if the expert desires changes. The knowledge engineer will then go through the additional step of refining these definitions to suit CLIPS (step 446).

If it is determined at step 452 that the input command is a VIEW ADD command or VIEW REQ command, the appropriate files such as the addlog files are brought into a window in an editor of the knowledge engineer/user's choice. Such editors include, for example, vi or emacs. This enables the knowledge engineer to view all requests and additions so as to facilitate the knowledge engineer's task of knowledge management. In other words, the knowledge engineer reviews the added or requests data at step 456 before the view process ends at step 458.

If it is determined at step 460 that the input command is a MODIFY command, the dialog box pops up at step 462 to prompt the user for the problem description. This functionality aids the knowledge engineer in the development and maintenance of the knowledgebase in that all users are allowed to enter a description of the problem that they see and possibly make suggestions in normal English. As known to those skilled in the art, users are perhaps the best source of knowledge for any expert system because they are in the best position to see what is wrong. They also provide the knowledge engineer with a valuable set of enhancement requests which keeps the expert system along the right development track. Moreover, advances in technology could require state changes to the knowledgebases. The MODIFY facility enables these state changes to be performed on an incremental basis so as to make the task of the knowledge engineer much easier.

Thus, after the user inputs the problem description at step 462, the appropriate rulebase is loaded at step 464 and the problem description entered by the user at step 466. If it is determined at step 468 that the user has entered a problem description, this data is added to a modlog file at step 470 which logs information regarding a particular knowledgebase. This modlog file contains the modification descriptions, user names, and the time when the user requested the change. A knowledge engineer is thus in a position to review these modlog files on a periodic basis and either incorporate, disregard or get further clarification on the change requests. Any changes to the knowledgebase are made at step 472. The modifications may be viewed by selecting the VIEW REQ command from the XCLIPS command window 108. Processing of the MODIFY command then ends at step 474.

If it is determined at step 476 that the input command is a REPORT command, a window is created at step 478 so that the user can input report data at step 480 which is then saved to a report file at step 482 for subsequent review by the knowledge engineer. The REPORT command thus provides a simple communications technique to prevent the users from having to track down the knowledge engineer to relay information. The REPORT command then ends at step 484.

The QUIT command is pressed by the user when the user wishes to exit the CLIPS environment and close the XCLIPS interface.

Finally, the INPUT key is used to answer questions in the rulebase as previously described.

By writing XCLIPS using the afore-mentioned X11 toolkit, XCLIPS may be displayed over a number of diskless servers hooked up via a local area network or wide area network. This enables users who are in geographically remote places to communicate or interact with a CLIPS environment when CLIPS is run from a central processing node. In fact, with the use of X terminals and high baud rate modems, users who are in the field can still interact with a central CLIPS environment via XCLIPS as herein described. Moreover, the XCLIPS interface is designed such that any executable function like CLIPS can be attached below it. Since the buttons (or icons) on the top-level window 108 can be configured to suit the needs of a particular organization, it should be apparent to one of ordinary skill in the art that the usefulness of the interface of the invention extends well beyond the CLIPS environment.

A source code listing of XCLIPS written in the computer program language C follows as APPENDIX A. Each of the afore-mentioned commands is implemented therein. As will be apparent to one skilled in the art, APPENDIX A first defines the overall windows and links the buttons corresponding to the commands in the top-level window 108 to the requisite CLIPS functions. Each of the aforementioned commands is then described and linked to CLIPS, as necessary, using the Unix® pipe utility 104. The remainder of the features of APPENDIX A are believed to be self-explanatory to those of ordinary skill in the art.

APPENDIX A

```
/*
 *              Copyright 1989 by Srikanth S
 *
 *                    All Rights Reserved
 *
 *
 *
 *
 *
 *
 */

/******************************************************
 * xclips.c: An X-interface to Clips
 ******************************************************/
#include     <stdio.h>
#include     <ctype.h>
#include     <X11/StringDefs.h>
#include     <X11/Intrinsic.h>
#include     <X11/Shell.h>
#include     <Xw/Xw.h>
#include     <Xw/PButton.h>
#include     <Xw/VPW.h>
#include     <Xw/RCManager.h>
#include     <Xw/BBoard.h>
#include     <Xw/TextEdit.h>
#include     <Xw/SText.h>
#include     "libXs.h"

/*
 * Globals and functions defined in this file
 */ extern void talkto();
extern Widget create_one_line_text_widget();

char         rb_name[64];
Widget       display_i, display_o;
void         quit_clips();
void         get_from_clips();
void         send_clips();
void         do_nothing();
void         get_rb_name();
Widget       run_popup();
void         re_run();
Widget       req_popup();
Widget       add_popup();
void         view_req();
void         view_add();
void         mod_rb();
void         get_add_info();
void         get_req_info();

main(argc, argv)
    int      argc;
    char     *argv[];
{

Widget   toplevel, lrpopup, panel, keyboard, quit, done_i, run;
Widget   viadd, addpopup, reqpopup, req, add, vireq, modrb, rerun;
Arg      wargs[2];
int      n;

toplevel = XtInitialize(argv[0], argv[1], NULL, 0,
                        &argc, argv);
/*
 * Create a vertical paned widget as a base for the
 * rest of the calculator.
```

```
	*/
	panel = XtCreateManagedWidget("panel",
					XwvPanedWidgetClass,
					toplevel, NULL, 0);

/*
	 * Make the panel, that manages 8 columns of button
	 */
	XtSetArg(wargs[0], XtNcolumns, 5);
	keyboard = XtCreateManagedWidget("keyboard",
					XwrowColWidgetClass,
					panel, wargs, 1);
	/*
	 * Create the keyboard buttons. This order makes it
	 * look like a typical desktop calculator.
	 * try and write 2 funcs make_toplevel_buttons(kbd);
	 * and make_lower_level_yes_no(kbd);
	 * and make_lower_level_number(kbd);
	 */
	run = XtCreateManagedWidget("Run...    ", XwpushButtonWidgetClass,
					keyboard, NULL, 0);

lrpopup = run_popup(toplevel, run);

XtAddCallback(run, XtNrelease, XtCallbackNone, lrpopup);

rerun = XtCreateManagedWidget("ReRun... ", XwpushButtonWidgetClass,
					keyboard, NULL, 0);
	XtAddCallback(rerun, XtNselect, re_run, NULL);

add = XtCreateManagedWidget("Add... ", XwpushButtonWidgetClass,
					keyboard, NULL, 0);

addpopup = add_popup(toplevel, add);

XtAddCallback(add, XtNrelease, XtCallbackNone, addpopup);

req = XtCreateManagedWidget("Report... ", XwpushButtonWidgetClass,
					keyboard, NULL, 0);

reqpopup = req_popup(toplevel, req);

XtAddCallback(req, XtNrelease, XtCallbackNone, reqpopup);

viadd = XtCreateManagedWidget("View Add... ", XwpushButtonWidgetClass
					keyboard, NULL, 0);
	XtAddCallback(viadd, XtNselect, view_add, NULL);

vireq = XtCreateManagedWidget("View Req... ", XwpushButtonWidgetClass
					keyboard, NULL, 0);
	XtAddCallback(vireq, XtNselect, view_req, NULL);

modrb = XtCreateManagedWidget("Modify...   ", XwpushButtonWidgetClass,
					keyboard, NULL, 0);
	XtAddCallback(modrb, XtNselect, mod_rb, NULL);

quit = XtCreateManagedWidget("Quit     ", XwpushButtonWidgetClass,
					keyboard, NULL, 0);
	XtAddCallback(quit, XtNselect, quit_clips, NULL);

/*
	 * Create the output region of the encapsulated tool
	 */

XtCreateManagedWidget("lab1", XwstatictextWidgetClass,
					panel, "Response Area", 0);
	n = 0;
	XtSetArg(wargs[n], XtNstring, "");n++;
	XtSetArg(wargs[n], XtNeditType, XwtextEdit);n++;
	display_o = XtCreateManagedWidget("display_o", XwtexteditWidgetClass,
					panel, wargs, n);

/*
	 * Create the input region for the encapsulated tool
	 */
	XtCreateManagedWidget("lab2", XwstatictextWidgetClass,
					panel, "Input Area (Input button to evalua n = 0;
	XtSetArg(wargs[n], XtNstring, "");n++;
	XtSetArg(wargs[n], XtNeditType, XwtextEdit);n++;
	display_i = create_one_line_text_widget("display_i", panel,
					wargs, n);
	done_i = XtCreateManagedWidget("Input    ", XwpushButtonWidgetClass,
					keyboard, NULL, 0);
	XtAddCallback(done_i, XtNselect, send_clips, display_i);
```

```
/*
 * Add callback get_from_clips() --  invoked when input
 * is available from stdin.
 */

XtAddInput(fileno(stdin), XtInputReadMask,
          get_from_clips, display_o);

/*
 * Exec the program "clipsox" and set up pipes
 * between it and us (clipsox is in unbuffered io mode)
 */ talkto("clipsox");

XtRealizeWidget(toplevel);

XtMainLoop();
} void quit_clips(w, client_data, event)
    Widget         w;
    caddr_t        client_data;
    XEvent         *event;
{
    /*
     * Tell clips to quit.
     */
    fprintf(stdout,"(exit)");  /* exit the clips env... */
    exit(0);                   /* exit this parent process */
} void send_clips(w, w1,call_data)
    Widget w;
    Widget w1;
    caddr_t call_data;
{
     fprintf(stdout, "%s\n", XwTextCopyBuffer(w1));
     reset_display(w1);
     fflush(stdout);
} void get_from_clips(w, fid, id)
    Widget         w;
    int            *fid;
    XtInputId      *id;
{
    char           buf[1024];
    int            nbytes,i;

/*
     * Get all pending input and append it to the display widget.
     */
  nbytes = read(*fid, buf, 1024); /* reasonable size for the buffer */
    if (nbytes) { buf[nbytes] = '\0';

XwTextInsert(w, buf);

}
} reset_display(wid)
    Widget wid;
{
  /*
   * Clear the text buffer and go to position 1.
   */
  XwTextClearBuffer(wid);
  XwTextSetInsertPos(wid, 0);
}

/*
 * Functions bound to the callbacks of the command buttons
 * parent for any popups is assumed to be toplevel
 */
```

```
Widget run_popup(parent, enable)
    Widget parent, enable;

{
    Widget bb, popup, done, label1, ed1, kbd;
    Widget button1, button2;
    static XtPopdownIDRec pdrec;
    Arg wargs[2];
    int i;

popup = XtCreatePopupShell("lrpopup", shellWidgetClass,
                            parent, NULL, 0);

bb = XtCreateManagedWidget("bb", XwvPanedWidgetClass,
                            popup, NULL, 0);

XtSetArg(wargs[0], XtNeditType, XwtextEdit);

label1 = XtCreateManagedWidget("lab", XwstatictextWidgetClass,
                            bb, "Rule Base", 0);

ed1 = create_one_line_text_widget( "edit1", bb, wargs, 1);

XtSetArg(wargs[0], XtNcolumns,2);
    kbd = XtCreateManagedWidget("kbd",
                            XwrowColWidgetClass,
                            bb, wargs, 1);

button1 = XtCreateManagedWidget("OK", XwpushButtonWidgetClass,
                            kbd, NULL, 0);
    XtAddCallback(button1, XtNselect, get_rb_name, ed1);

button2 = XtCreateManagedWidget("Cancel", XwpushButtonWidgetClas
                            kbd, NULL, 0);
    pdrec.shell_widget = popup;
    pdrec.enable_widget = enable;

XtAddCallback(button2, XtNrelease, XtCallbackPopdown, &pdrec);

return popup;
} void get_rb_name(w, textwidget, call_data)
    Widget w;
    Widget textwidget;
    caddr_t call_data;
{ sprintf(rb_name, "%s", XwTextCopyBuffer(textwidget));

fprintf(stdout, "(clear)\n");
        fprintf(stdout, "(load \"%s.clp\")\n", rb_name);
        fprintf(stdout, "(reset)\n");
        fprintf(stdout, "(run)\n");

} void re_run(w, client_data, event)
    Widget      w;
    caddr_t     client_data;
    XEvent      *event;
{
    /*
     * Tell clips to quit.
     */
    fprintf(stdout,"(reset)\n");
    fprintf(stdout,"(run)\n");

} void view_add(w, client_data, event)
    Widget      w;
    caddr_t     client_data;
    XEvent      *event;
{
    char cmnd[128];
    sprintf(cmnd, "hpterm -bg navy -fg white -e view %s.add &", rb_name
    system(cmnd);
} void view_req(w, client_data, event)
    Widget      w;
    caddr_t     client_data;
    XEvent      *event;
{
    char cmnd[128];
    sprintf(cmnd, "hpterm -bg navy -fg white -e view %s.req &", rb_name
    system(cmnd);
```

```
void mod_rb(w, client_data, event)
    Widget         w;
    caddr_t        client_data;
    XEvent         *event;
{
    char cmnd[128];
    sprintf(cmnd, "hpterm -bg navy -fg white -e vi %s.clp &", rb_name);
    system(cmnd);
}
Widget add_popup(parent, enable)
    Widget parent, enable;

{
    Widget bb, popup, done, label1, ed1, kbd;
    Widget button1, button2;
    static XtPopdownIDRec pdrec;
    Arg wargs[2];
    int i;

popup = XtCreatePopupShell("addpopup", shellWidgetClass,
                    parent, NULL, 0);

bb = XtCreateManagedWidget("bb", XwvPanedWidgetClass,
                    popup, NULL, 0);

XtSetArg(wargs[0], XtNeditType, XwtextEdit);

label1 = XtCreateManagedWidget("lab", XwstatictextWidgetClass,
                    bb, "ADD", 0);

ed1 = XtCreateManagedWidget( "edit1", XwtexteditWidgetClass,bb, " ", 0);

XtSetArg(wargs[0], XtNcolumns, 2);

kbd = XtCreateManagedWidget("kbd",
                    XwrowColWidgetClass,
                    bb, wargs, 1);

button1 = XtCreateManagedWidget("OK", XwpushButtonWidgetClass,
                    kbd, NULL, 0);
    XtAddCallback(button1, XtNselect, get_add_info, ed1);

button2 = XtCreateManagedWidget("Cancel", XwpushButtonWidgetClass,
                    kbd, NULL, 0);
    pdrec.shell_widget = popup;
    pdrec.enable_widget = enable;

XtAddCallback(button2, XtNrelease, XtCallbackPopdown, &pdrec);

return popup;
}

Widget req_popup(parent, enable)
    Widget parent, enable;

{
    Widget bb, popup, done, label1, ed1, kbd;
    Widget button1, button2;
    static XtPopdownIDRec pdrec;
    Arg wargs[2];
    int i;

popup = XtCreatePopupShell("reqpopup", shellWidgetClass,
                    parent, NULL, 0);

bb = XtCreateManagedWidget("bb", XwvPanedWidgetClass,
                    popup, NULL, 0);

XtSetArg(wargs[0], XtNeditType, XwtextEdit);

label1 = XtCreateManagedWidget("lab", XwstatictextWidgetClass,
                    bb, "REQUEST", 0);

ed1 = XtCreateManagedWidget( "edit1", XwtexteditWidgetClass,bb," ", 0);

XtSetArg(wargs[0], XtNcolumns, 2);

kbd = XtCreateManagedWidget("kbd",
                    XwrowColWidgetClass,
                    bb, wargs, 1);

button1 = XtCreateManagedWidget("OK", XwpushButtonWidgetClass,
                    kbd, NULL, 0);
    XtAddCallback(button1, XtNselect, get_req_info, ed1);
```

```
        button2 = XtCreateManagedWidget("Cancel", XwpushButtonWidgetClass,
                                        kbd, NULL, 0);
        pdrec.shell_widget = popup;
        pdrec.enable_widget = enable;

XtAddCallback(button2, XtNrelease, XtCallbackPopdown, &pdrec);

return popup;
} void get_add_info(w, textwidget, call_data)
    Widget w;
    Widget textwidget;
    caddr_t call_data;
{
        char file_name[64];
        FILE *fp;

sprintf(file_name, "%s.add", rb_name);
        if ((fp = fopen(file_name, "a")) == NULL)
            exit(1);
        else {
            fprintf(fp, "*****************************************************\n"
            fprintf(fp, "Rule Addition by: %s at: %ld\n", getlogin(),time((lo
            fprintf(fp, "%s\n", XwTextCopyBuffer(textwidget));
        }
        fclose(fp);
} void get_req_info(w, textwidget, call_data)
    Widget w;
    Widget textwidget;
    caddr_t call_data;
{
        char file_name[64];
        FILE *fp;

sprintf(file_name, "%s.req", rb_name);
        if ((fp = fopen(file_name, "a")) == NULL)
            exit(1);
        else { fprintf(fp, "*****************************************************\n")
            fprintf(fp, "Rule Modification Request by: %s at: %ld\n", getlogin
            fprintf(fp, "%s\n", XwTextCopyBuffer(textwidget));
        }
        fclose(fp);
}
```

APPENDIX B

```
#include <stdio.h>
include "clips.h"

/*****************************************************************/
/* MAIN: Start execution of CLIPS.  This function must be        */
/*    redefined in order to embed CLIPS within another program.  */
/*    Example of redefined main:                                 */
/*       main()                                                  */
/*       {                                                       */
/*          init_clips();                                        */
/*             .                                                 */
/*             .                                                 */
/*             .                                                 */
/*          process_data();                                      */
/*          run(-1);                                             */
/*          evaluate_data();                                     */
/*             .                                                 */
/*             .                                                 */
/*             .                                                 */
/*          final_results();                                     */
/*       }                                                       */
/*****************************************************************/
main()
```

```
{
 setbuf(stdout,NULL);
 init_clips();
 cl_print("wclips","          CLIPS (V4.01 06/12/87)\n");
 command_loop();
}
```

```
/***************************************************************/
/* USRFUNCS:  The function which informs CLIPS of any user     */
/*    defined functions.  In the default case, there are no    */
/*    user defined functions.  To define functions, either     */
/*    this function must be replaced by a function with the    */
/*    same name within this file, or this function can be      */
/*    deleted from this file and included in another file.     */
/*    User defined functions may be included in this file or   */
/*    other files.                                             */
/*    Example of redefined usrfctns:                           */
/*       usrfuncs()                                            */
/*       {                                                     */
/*          define_function("fun1",'i',fun1);                  */
/*          define_function("other",'f',other);                */
/*       }                                                     */
/***************************************************************/ usrfuncs()
{

} usrfuncs()
{
external int video1();
define function("video1",'i',video1);
} include <stdio.h>
include "clips.h"
int video1()
{
char *arg1;
char cmnd[128];
        arg1 = rstring(1);

sprintf(cmnd, "gotoframe %s", arg1);
        printf("In video1 and cmnd is %s\n", cmnd);
        system(cmnd);
}
```

A particular expert system implementing the CLIPS rulebase and XCLIPS will now be described with respect to FIG. 5.

As noted in the background portion of the specification, expert systems have not heretofore been successfully implemented in manufacturing environments to eliminate manufacturing errors. However, XCLIPS and CLIPS as herein described now have been used by the present inventors to develop a photolith analysis and control (PAC) expert system that assists photolithography inspectors during the integrated circuit fabrication process. Such a manufacturing environment has been chosen for implementing an expert system since strict control of the process line is required and lack of control often results in costly errors. In photolithography, flaws that occur during the integrated circuit patterning process should be correctable within the same step; therefore, expert systems are particularly helpful for the diagnosis and troubleshooting of these flaws in realtime. The PAC system has been designed for this purpose.

The PAC expert system has been designed using the above-mentioned XCLIPS interface in order to relieve engineers from solving routine problems during the integrated circuit fabrication process and to facilitate training of operators and technicians in a systematic and cost effective manner. The PAC system has also been designed to reduce the complexity due to multiple processes in the fabrication process and to enable technology transfer between disparate divisions. Also, since the PAC system operates in real-time, interruptions in the production schedule may be avoided by providing instant feedback when problems are encountered. Moreover, repeat errors are prevented by providing correct feedback, and problems may be traced by maintaining a log of user interactions with the PAC system.

The PAC rulebase is written in CLIPS and contains two interfaces. The first is the XCLIPS interface (as described above) which facilitates user interaction with the underlying PAC rulebase. The second is a video interface which preferably displays still photographs on a monitor such as video monitor 114 of FIG. 1. As noted above, the XCLIPS interface is implemented using a standard Xll tool kit. It is comprised of a top level window that controls several lower level windows which are used to elicit information from the user, whereas the top level window controls user actions and eventually the execution of the PAC rulebase. The top-level window communicates with the PAC rulebase via a Unix ® pipe model as described with respect to FIG. 1. In particular, XCLIPS was used as described above to facilitate development of a PAC rulebase.

The video interface allows operators to identify defects visually as opposed to identification based on a verbal description. By using a video interface, terminology differences in referring to a defect may be minimized. Preferably, the video interface is implemented as an embedded CLIPS application and is made accessible through a simple command via a rule in the PAC rulebase. Based on the user interaction with the PAC rulebase, certain video interface events are triggered off via which the hardware consisting of, for example, a video disc player and a monitor are activated. This results in the display of a still photograph of the appropriate defect on the monitor which is, in turn, identifiable by the user. A source code listing in the C programming language of a preferred embodiment of the video interface is included below as APPENDIX B.

Figure 5:
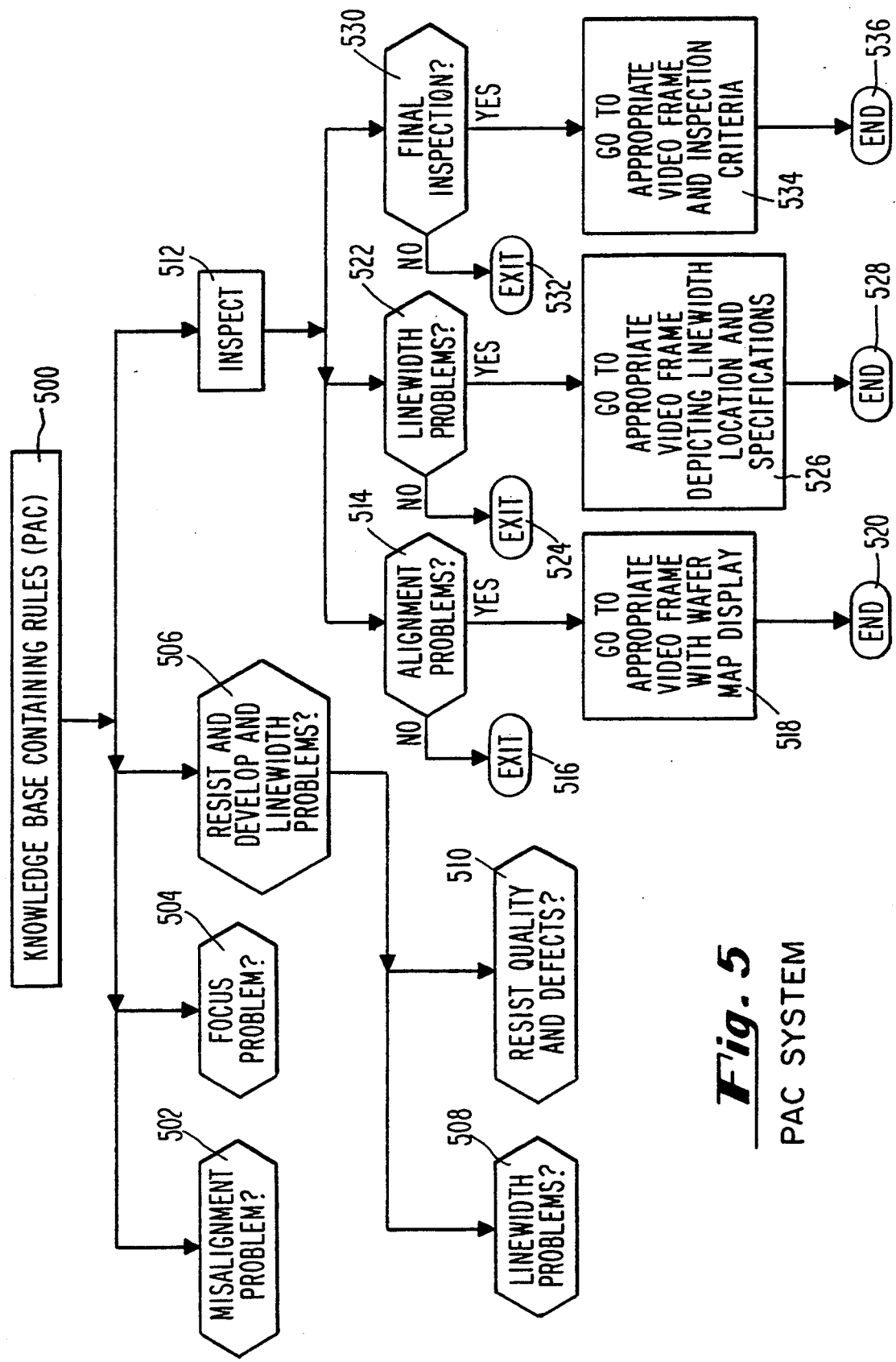
FIG. 5 illustrates how the knowledgebase of the invention may be used to control a photolithography process.

The PAC system of FIG. 5 includes a knowledgebase containing rules (PAC) 500 which is developed using XCLIPS. The knowledge data is provided from the knowledgebase 500 depending upon whether the detected problem is a misalignment problem (502), a focus problem (504) or resist and development problem (506–510). The video interface allows the user to inspect the errors (512) to determine whether there are any alignment problems (514–520), whether there are any linewidth problems (522–528) and whether a final inspection of the integrated circuit is to be conducted (530–536). Preferably, the expert system feedback for the different problems (502–510) can be used concurrently with the video interface to compare the same problems (514,522,530). Such an integrated system provides for tight analysis and control of the underlying manufacturing process.

The PAC system developed using XCLIPS is a particular embodiment of an expert system which is implemented as two cooperating sub-systems, the first having to do with analysis and the second with control. The analysis subsystem helps in the diagnosis of the problem, while the control sub-system helps in monitoring parameters so that violations can be detected at once. The analysis sub-system is augmentable by experienced operators who may recognize the category of the problem. The analysis sub-system may deal with three major classes of problems as will be apparent to those skilled in the art of photolithography. These major classes of problems are: (1) alignment, where the stepper aligns the present layer with respect to previous layers; (2) focus, which is both a stepper-related as well as an underlying substrate problem; and (3) resist quality, relating to linewidth out of specification problems and to problems in the resist and development process. This category also has to do with areas like contamination, particulars and underlying layers, excess patterns and the like. The three categories of problems are to an extent interdependent and, as a result, could lead to ambiguous situations. This ambiguity problem is handled by eliciting extra input from the user so that constraints to the situation can be made tighter so as to result in a better identification of the problem.

The PAC system is thus a user interface and knowledgebase for engineers which has been designed using the above-mentioned XCLIPS interface. It allows engineers to have access to a special problem-solving knowledgebase where they can input their views in a natural language. The iteration carries on for a long period of time until the views are rationalized and input as a rule into the main PAC rulebase. Complaints against the PAC's response may be submitted, and the users are given the opportunity to ask for changes in the PAC rulebase. Using such a PAC system, a trainer can simulate a problem and train a new user immediately (using the video monitor). The PAC system thus can be used in the manufacturing environment to provide wide user access to an expert system.

Thus, a particular embodiment of the invention has been described as a flexible X11 interface to the CLIPS environment called XCLIPS. Those skilled in the art will appreciate that the artificial intelligence interface of the invention can be implemented with other artificial intelligence modules and with other user interfaces besides X11 windows. Those skilled in the art will also appreciate that the artificial intelligence interface of the invention provides several benefits in that it reduces overhead by making artificial intelligence technology available in a usable form to a wider variety of users. The interface of the invention also facilitates knowledge acquisition by allowing several experts to simultaneously modify knowledgebases provided that these knowledgebases have been partitioned appropriately by the knowledge engineer with the help of the experts. This allows the knowledge engineer to go about doing his or her job while the expert works at his or her portion of the knowledgebase. In the end, the knowledge engineer may be responsible for the merge of these knowledgebases so that they run as a collective whole. Any contradictions which arise are resolved with help of the aforementioned log files. The interface is also of great help to the knowledge engineer during the merge process, for it allows simultaneous views, it allows for an editor of the knowledge engineer's choice, it helps conflict resolution via logs, and it allows the developing knowledgebase to run in an iterative fashion until debugged.

Although an exemplary embodiment of the invention has been described in detail above, those skilled in the art will readily appreciate that many additional modifications are possible in the exemplary embodiment without materially departing from the novel teachings and advantages of the invention. For example, the above-mentioned system can be modified to provide for the connection of a real-time monitoring system to the rulebase via a filtering system. The filtering system would monitor the data from the real-time system and interact with the rulebase and flag operators in case there are any critical problems in the flow lines. In addition, a scheduling system may also be incorporated so that the flow lines inside the fabrication laboratory are utilized more efficiently. Accordingly, all such modifications are intended to be included within the scope of this invention as defined in the following claims.

We claim:

1. A method of developing an expert system having a knowledgebase using an artificial intelligence program loaded on a computer system and knowledge data provided, via a data input/output system of said computer system, by a user of said artificial intelligence program who is not necessarily competent in any computer language, comprising the steps of:

interfacing via an interface said artificial intelligence program to said data input/output system of said computer system such that said artificial intelligence program and said data input/output system may communicate knowledge data therebetween, said interface having a predetermined set of commands for controlling the communication of said knowledge data to/from said artificial intelligence program;

said user selecting predetermined ones of said predetermined set of commands to run said artificial intelligence program;

said user inputting acquired knowledge data to said artificial intelligence program in response to inquiries from said artificial intelligence program via said interface;

said user selecting other commands of said predetermined set of commands to add knowledge data to said knowledgebase or to modify knowledge data of said knowledgebase and inputting human language phrases comprising facts and rules representing the knowledge data to be added or modified as a problem description of a problem encountered during the running of said artificial intelligence program;

said interface storing said knowledge data inputted by said user in response to inquiries from said artificial intelligence program and said inputted human language phrases representing said problem description together in a file of a programming shell of said artificial intelligence program, said file being unique to said knowledgebase and unique to said user; said expert system storing to said file an indication as to when and where during the running of said artificial intelligence program said problem described in said problem description was encountered;

programming, by a knowledge engineer who is proficient in a computer language understandable by said artificial intelligence program, said stored human language phrases representing said problem description into said artificial intelligence program in said computer language understandable by said artificial intelligence program; and said knowledge engineer updating said knowledgebase on a periodic basis in accordance with said human language phrases programmed into said computer language understandable by said artificial intelligence program.

2. A method as in claim 1, comprising the further step of distributing said expert system to multiple users over a computer network so that said multiple users can share knowledge data.

3. A method as in claim 1, wherein said knowledge data comprises descriptions of manufacturing defects detected during a manufacturing process.

4. A method as in claim 3, comprising the further step of displaying said manufacturing defects on a video monitor so that the user pan properly identify the manufacturing defect to be input as said knowledge data.

5. A method of providing a user, who is not necessarily competent in any computer language, access via a data input/output system of a computer system to knowledge data stored in a knowledgebase of an expert system using an artificial intelligence program loaded on said computer system, comprising the steps of:

interfacing via an interface said artificial intelligence program to said data input/output system of said computer system such that said artificial intelligence program and said data input/output system may communicate knowledge data therebetween, said interface having a predetermined set of commands for controlling the communication of said knowledge data to/from said artificial intelligence program;

said user selecting one of said predetermined set of commands to access said artificial intelligence program;

said interface converting said selected command into a computer language understandable by said artificial intelligence program;

said user inputting acquired knowledge data to said artificial intelligence program via said interface as human language phrases in accordance with said selected command;

said interface storing said inputted human language phrases in a file of a programming shell of said artificial intelligence program, said file being unique to said knowledgebase and unique to said user; said expert system storing to said file an indication as to when and where during the running of said artificial intelligence program said user input said human language phrases; and programming, by a knowledge engineer who is proficient in a computer language of said artificial intelligence program, said stored human language phrases into said artificial intelligence program in said computer language understandable by said artificial intelligence program, thereby updating said knowledgebase.

6. A method as in claim 5, comprising the further step of distributing said interface and said artificial intelligence program to multiple users over a computer network so that said multiple users can share knowledge data.

7. A method as in claim 5, wherein said knowledge data comprises descriptions of manufacturing defects detected during a manufacturing process.

8. A method as in claim 7, comprising the further step of displaying said manufacturing defects on a video monitor so that the user can properly identify the manufacturing defect to be input as said knowledge data.

9. An expert system loaded on a computer system having a data input/output device, comprising:

a knowledgebase for storing accumulated knowledge data input over time;

a rule based artificial intelligence program loaded on said computer system for manipulating said knowledge data to update said knowledgebase; and a data communications interface for interfacing said artificial intelligence program to said data input/output device of said computer system such that said artificial intelligence program and said data input/output device may communicate knowledge data therebetween, said interface comprising means for controlling the communication of knowledge data provided by a user who is not necessarily competent in any computer language to and from said artificial intelligence program, and means for accepting knowledge data from said user as human phrases describing a problem encountered during the running of said artificial intelligence program and for storing said human language phrases in a file of a programming shell of said artificial intelligence program, said expert system storing to said file an indication as to when and where during the running of said artificial intelligence program said problem was encountered, said file being unique to said knowledgebase and to said user, whereby said stored human language phrases are later converted into a computer language understandable by said artificial intelligence program by a knowledge engineer who is proficient in said computer language of said artificial intelligence program for use by said artificial intelligence program in updating said knowledgebase and in modifying rules of said artificial intelligence program.

10. An expert system as in claim 9, wherein said computer system comprises a plurality of data input/output devices connected over a computer network for providing access to said expert system by multiple users so that said multiple users can access shared knowledge data.

11. An expert system as in claim 9, wherein said knowledge data comprises descriptions of manufacturing defects detected during a manufacturing process.

12. An expert system as in claim 11, further comprising a video monitor for displaying said manufacturing defects so that the user can properly identify the manufacturing defect to be input as said knowledge data.

13. An expert system as in claim 9, wherein said means for controlling the communication of knowledge data comprises a control window having a predetermined set of commands and a data pipeline for passing said knowledge data between said artificial intelligence program and said data input/output device of said computer system.

14. An expert system as in claim 13, wherein said predetermined set of commands includes an add command and a modify command for respectively adding to and modifying said knowledgebase in accordance with user input to said interface.

* * * * *

UNITED STATES PATENT AND TRADEMARK OFFICE
CERTIFICATE OF CORRECTION

PATENT NO. : 5,412,758
DATED      : May 2, 1995
INVENTOR(S) : Usha Srikanth, et al It is certified that error appears in the above-indentified patent and that said Letters Patent is hereby corrected as shown below:

Column 32, line 33, clause beginning "said expert system..." should be a new indented paragraph.

Column 32, line 59, "pan" should read --can--.

Column 33, line 23, clause beginning "said expert system..." should be a new indented paragraph.

Signed and Sealed this

Fifth Day of October, 1999

Attest:

Attesting Officer

Q. TODD DICKINSON

Acting Commissioner of Patents and Trademarks